United States Patent
Dailey et al.

(10) Patent No.: US 7,457,945 B2
(45) Date of Patent: Nov. 25, 2008

(54) SYSTEM AND METHOD FOR PROVIDING A SECURE FIRMWARE UPDATE TO A DEVICE IN A COMPUTER SYSTEM

(75) Inventors: James E. Dailey, Round Rock, TX (US); Anthony L. Overfield, Austin, TX (US); James L. Walker, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 794 days.

(21) Appl. No.: 10/806,562

(22) Filed: Mar. 23, 2004

(65) Prior Publication Data

US 2005/0216753 A1    Sep. 29, 2005

(51) Int. Cl.
*G06F 15/177* (2006.01)
(52) U.S. Cl. ......................................................... 713/2
(58) Field of Classification Search ........................ None
See application file for complete search history.

(56) References Cited

U.S. PATENT DOCUMENTS 6,965,994 B1 * 11/2005 Brownell et al. ............ 713/156
2004/0006700 A1 * 1/2004 Freeman et al. ............. 713/189

OTHER PUBLICATIONS

Windows (Lee Hadfield, Dave Hater, Dave Bixler, "Windows NT Server 4 Security Handbook", 1997, ISBN: 078971213), p. 28, 80-85.*
ABIT, "Bios Upgrade Guide", www.abit-usa.com/downloads/bioshelp.php, Apr. 2003.*
Wikipedia, "Control Flow", Aug. 2007.*

* cited by examiner

*Primary Examiner*—Kambiz Zand
*Assistant Examiner*—Peter Poltorak
(74) *Attorney, Agent, or Firm*—Baker Botts L.L.P.

(57) ABSTRACT

A system and method is disclosed for providing a firmware update to a device of a computer system in which a firmware update application and a firmware image are provided to a computer system. Verification steps are performed to insure that both the firmware update application and the user are authorized to perform the firmware update process. If the verification steps indicate that both the firmware update application and the user are authorized, the computer system is reset. During the boot process, the presence of the firmware update is recognized and the firmware update application is initiated, resulting in an update of the firmware of the device.

15 Claims, 4 Drawing Sheets

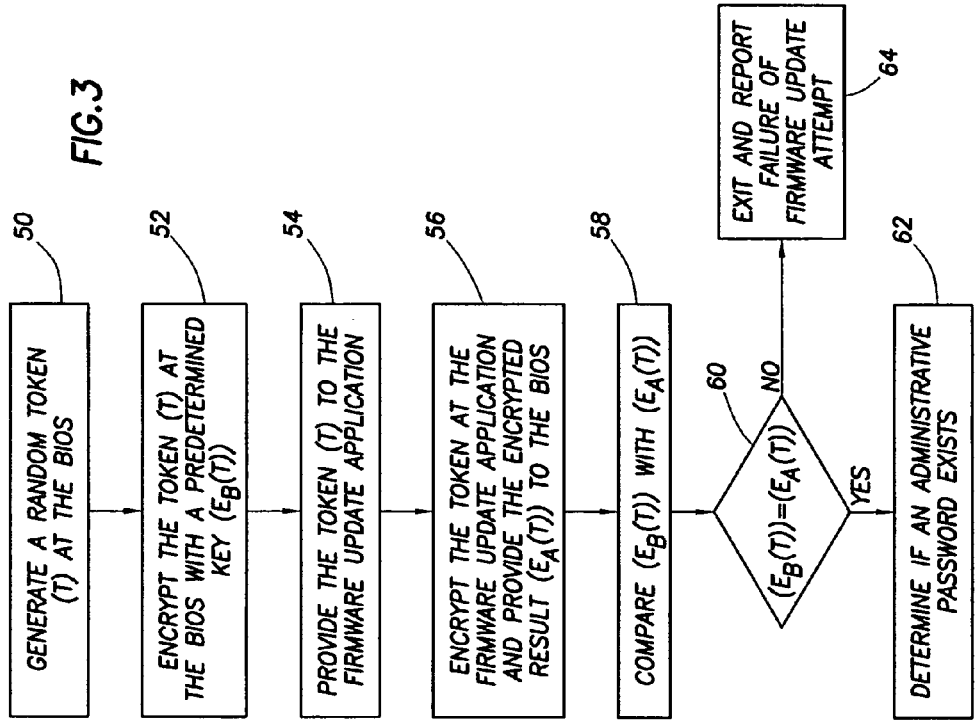
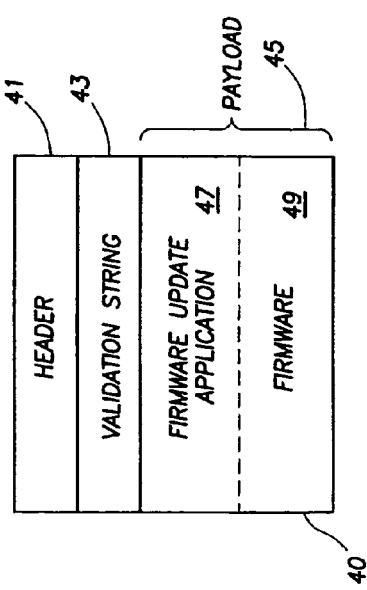

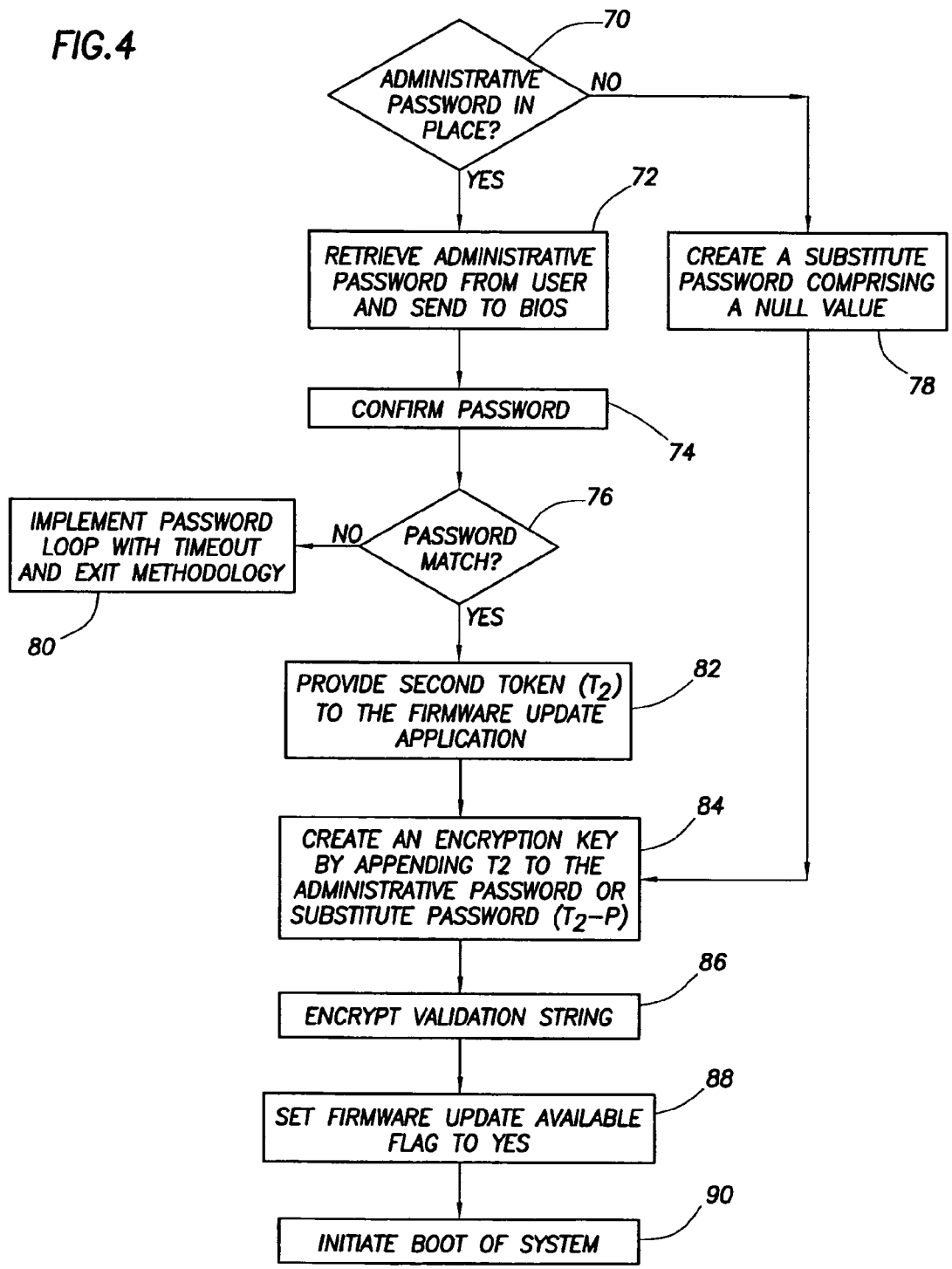

SYSTEM AND METHOD FOR PROVIDING A SECURE FIRMWARE UPDATE TO A DEVICE IN A COMPUTER SYSTEM

TECHNICAL FIELD

The present disclosure relates generally to the field of computer systems, and, more particularly, to a system and method for providing a firmware update to a device in a computer system.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include one or more devices that process or operate on the basis of firmware embedded in or near the device. These devices may include hard disk drives, CD-ROM drives, DVD drives, and various other devices that include controllers driven by firmware. Firmware is the program code embedded in a storage device and maintained within or near the device. The firmware for a device most often comprises the operational code for the device. Firmware is often stored in flash memory, which describes a class of memory that is erasable and is able to hold its content without power. From time to time, it may be necessary or desirable to update or upgrade the firmware of a device. A firmware upgrade may be necessary to correct errors in or improve the performance of the device. The process of updating the firmware of a device is sometimes referred to as "flashing" the device, as the firmware update program will replace the software image stored in the flash memory with a second software image.

It is difficult, if not impossible in the case of some devices, to perform a firmware update when the operating system of the computer system is operational. In an operating environment, the operating system accounts for and interacts with the devices of the computer system, thereby preventing the real-time update of the firmware of at least some devices of the computer system. Many firmware update techniques involve the step of rebooting the computer system to run a firmware update program, which is often a DOS-based program. The firmware update program is most often initiated by loading a diskette in the diskette drive of the computer system. When the computer system is booted, the boot order rules of the computer system will typically provide that the diskette drive has a higher boot priority than the hard drive of the computer system. When initiated, following a boot of the computer system, the firmware update program identifies the firmware image, loads that image on the device, and initiates another boot of the computer system. Following the second boot of the computer system, the firmware of the device is updated. One difficulty of using a diskette as the source of the firmware update program and the new firmware image is that many computer systems no longer include 3.5" floppy drives. Although placing the firmware update program and the firmware image on a CD-ROM disk or a DVD disk is an option, it would not be possible both to boot from CD-ROM drive or DVD drive while also updating the firmware of the CD-ROM drive or DVD drive.

SUMMARY

In accordance with the present disclosure, a system and method for providing a firmware update to a device of a computer system is disclosed in which a firmware update application and a firmware image are provided to a computer system. Verification steps are performed to insure that both the firmware update application and the user are authorized to perform the firmware update process. If the verification steps indicate that both the firmware update application and the user are authorized, a firmware update application may be initiated to cause firmware to be flashed or updated at the target device in place of the existing firmware at the target device.

A technical advantage of the present disclosure is that is not dependent on the presence of a floppy diskette drive in the computer system as a vehicle for delivering the firmware update to the computer system. Instead, the firmware is included in a firmware update memory image that additionally includes the self-contained firmware update application and an identifying header. This firmware payload may be provided to the computer system in any form of removable media or may be downloaded from a network, including the Internet as one example. The method provided herein is also advantageous in that includes multiple security levels. The firmware of a target device cannot be updated unless both the firmware update application and, if a user password is implemented, the user itself are authorized by the computer system.

Another technical advantage of the computer system is that the firmware update memory image is readily identifiable following the resetting or booting of the computer system. The header of the payload resembles in its data structure a header typical of other data structures that are identified or interrogated by the BIOS at startup. Thus, the header can be readily located without unduly delaying the boot process. Another technical advantage of the present disclosure is that the firmware update payload may contain a Windows™-based application and therefore need not contain a DOS-based application. DOS-based applications are often considered legacy software applications and may, in some cases, be incompatible with more recent operating systems that do not include a DOS execution platform for older applications. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 is a diagram of a firmware update memory image;

FIG. 3 is a flow diagram of a first series of steps of a process for updating the firmware of a device of a computer system;

FIG. 4 is a flow diagram of a second series of steps of a process for updating the firmware of a device of a computer system.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components. An information handling system, including a computer system, will typically include a number of devices that include firmware.

Figure 1:
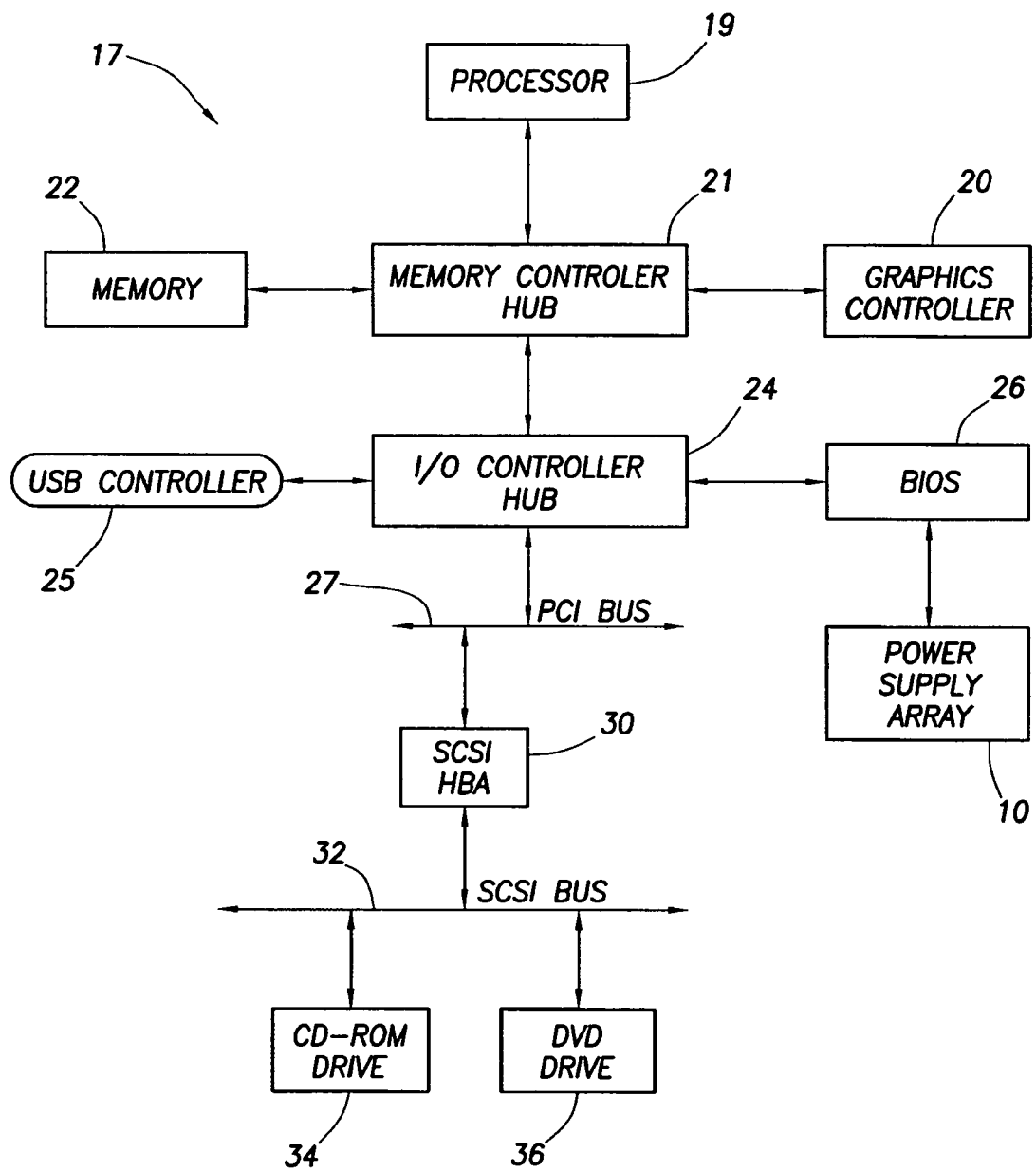
FIG. 1 is a diagram of an architecture of a computer system.

The architecture of a computer system, which is indicated generally at 17, is shown in FIG. 1. Computer system 17 includes a processor 19, which is coupled to a memory controller hub (MCH) 21. Memory controller hub 21 is coupled to a graphics controller 20 and system memory 22. Memory controller hub 21 is additionally coupled to an I/O controller hub (ICH) 24, which is coupled to a USB controller 25 and a PCI bus 27. I/O controller hub 24 is also coupled to BIOS 26, which is coupled via a communications link to the array controller of power supply array 10. One of the PCI slots on PCI bus 30 is occupied by a SCSI host bus adapter 30, which drives a SCSI bus 32. Coupled to SCSI bus 32 is a CD-ROM drive 34 and a DVD drive 36. Although the technique disclosed herein may be used to update the firmware of the CD-ROM drive 34 and the DVD drive 36, it should be recognized that the firmware update technique may also be used to update other devices, such as a hard disk drive, that are not shown in the architecture diagram of FIG. 1.

As a preliminary step to the process of applying a firmware update to a device of the computer system, the user will save to a memory location in the computer system a firmware update memory image. A diagram of the contents of the firmware update memory image 40 is shown in FIG. 2. Firmware update memory image 40 includes a header 41, a validation string 43, and a payload 45. Payload 45 includes a firmware update application 47 and firmware 49. Header 41 is a data structure header and serves to identify the firmware update memory image. Header 41 may also include data that identifies the size of validation string 43, firmware update application 47, and firmware 49. Firmware update application 47 is executable code that is initiated to load or flash firmware 49 into the target device. Firmware update application 47 may be a stand-alone application that uses only BIOS services to carry out its tasks, or firmware update application 47 may be a bootable image containing a small, self-contained operating system and an executable program that uses services provided by the self-contained operating system to carry out its task. An example of a self-contained operating system that could be used is MS-DOS of Microsoft Corporation of Redmond, Wash.

The firmware update application 47 may be initiated by a user of the computer system. With respect to FIG. 3, once the user initiates firmware update application, the BIOS at step 50 generates a random token (T), which is encrypted at step 52 with a predetermined key $E_B$. The result of the encryption step being represented by the notation $E_B(T)$. At step 54, the unencrypted token is passed to the firmware update application. The firmware update application at step 56 encrypts the token and provides the result, $E_A(T)$, to the BIOS. The BIOS performs a comparison function at step 58 to determine whether the result of the encryption of the token at the BIOS matches the result of the encryption at the firmware update application. If it is determined at step 60 that the encryption results are not the same, the firmware update process stops and the failure of the firmware update process is reported. If it is determined at step 60 that the encryption results are the same, it is next determined at step 62 whether an administrative password exists. Steps 50-60 of FIG. 3 comprise a verification step to confirm that the firmware update application has authority to execute a firmware update on the computer system. The BIOS of the computer system controls a master key. The firmware update application must have access to the key to provide a firmware update to any device in the computer system. As such, only those firmware update applications that are approved by the BIOS may perform a firmware update on a device in the computer system.

If the encryption results are the same, it is next determined at step 62 whether an administrative password has been established for the computer system. If an administrative password has been established for the computer system, the administrative password will be requested and, if confirmed as correct, used as part of a second encryption step. If an administrative password is not established for the computer system, the flow diagram moves from step 70 to the creation of an administrative password at step 78. The password that is created at step 78 in place of an actual password will be a predetermined null value, which may comprise, as just one example, all zeros. If it is determined at step 70 that an administrative password is in place for the computer system, the user is prompted to enter the password at step 72 and the password is transmitted to the BIOS for verification (step 74). If the attempted password match fails at step 76, the firmware update process continues at step 80, where the user is permitted to enter a password authentication loop for the purpose of retrying the password authentication step. Following a number of failed attempts, the password authentication loop will time out and the firmware update process will be terminated.

If the user enters the correct administrative password, a second token is provided to the firmware update application at step 82. At step 84, an encryption key is created by appending the administrative password to the second token. As such, step 84 involves the creation of an encryption key by combining the administrative password with a token provided by the BIOS. The step of creating an encryption key that combines the administrative password and a second token is not limited to a technique of appending the administrative password to the second token. Rather, any data manipulation technique that combines the content of the administrative key with the content of the second token is suitable. If there is not an administrative password, the substituted password having a null value is combined with the second token to create the encryption key. At step 86, validation string 43, which is shown in FIG. 2, is encrypted with the encryption key that was created in step 84. At step 88, the firmware update available flag is set to yes or true. At step 90, the system is booted.

Figure 5:
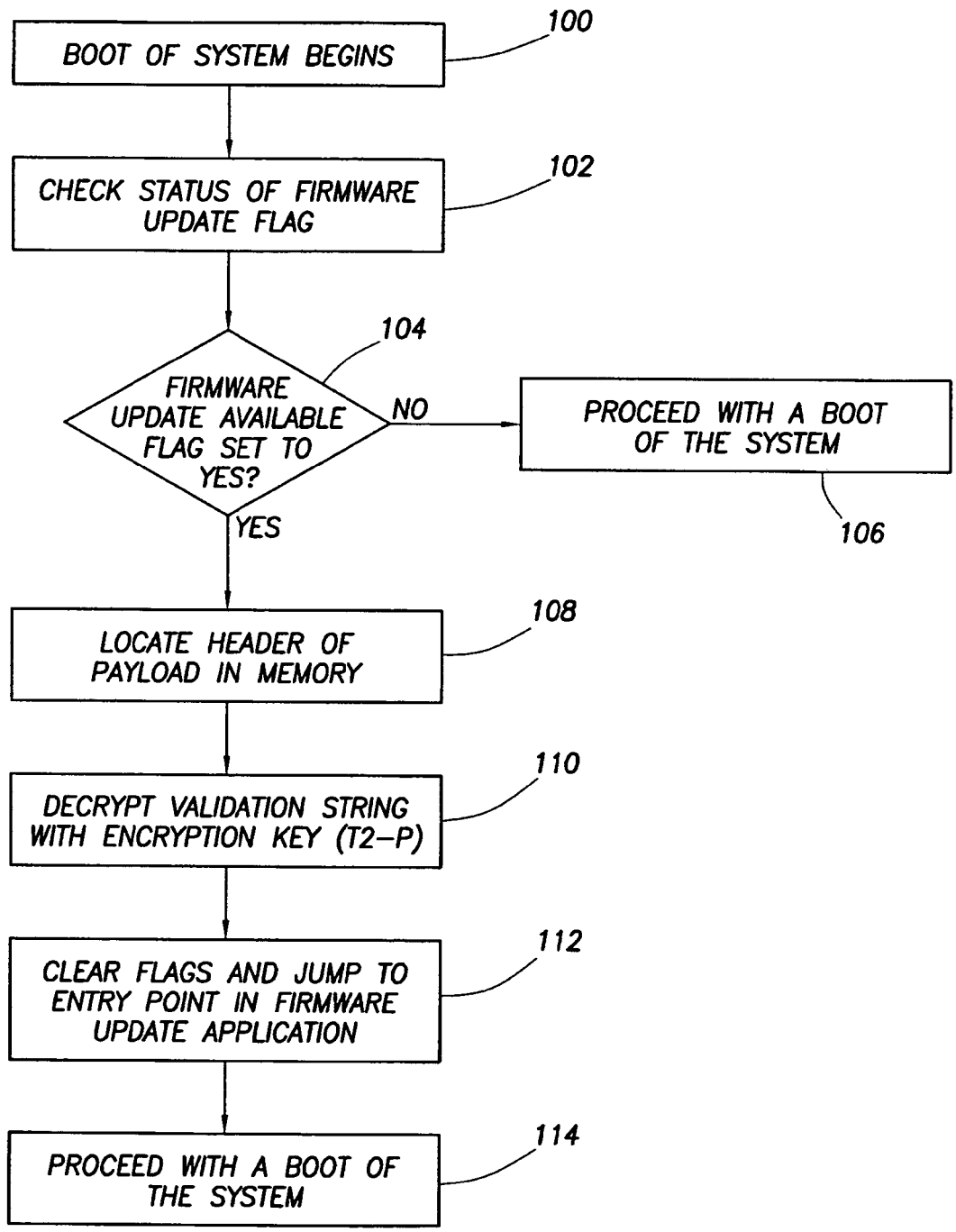
FIG. 5 is a flow diagram of a third series of steps of a process for updating the firmware of a device of a computer system.

Shown in FIG. 5 are a series of method steps that are implemented following a boot of the computer system. At step 100, the boot of the system is initiated and, at step 102, the boot program checks the firmware update available flag. If it is determined at step 104 that this flag is set to no or false, the boot of the system continues without further interruption for firmware updates at step 106. If the firmware update available flat is set to yes or true, the header of the payload is located in memory. The header serves as an identifier for the payload. At step 110, the validation string 43 of the firmware update memory image is decrypted with the encryption key that was created at step 84 of FIG. 2. Following the decryption of the validation string, the firmware update available flag is cleared at step 112 and the firmware update application 47 begins executing, beginning with an entry point of the application. The execution of the firmware update application 47 results in firmware 49 of the payload being saved to the target device as an update to the existing firmware of the target device. At step 114, the boot of the system continues.

The technique described in this disclosure is not limited in its application to firmware update utilities. Rather, the technique disclosed herein may be used to execute any number of low level software programs. The use of a dual-encryption system can be used to encrypt and then decrypt at startup any type of software program that is included within a payload. It should also be understood that the system and method disclosed herein is not limited to the precise architecture disclosed in the figures of the present disclosure. It should also be understood that the system and method disclosed herein is not limited in its application to updating the firmware of a specific device. Rather, the system and method disclosed herein may be used to update the firmware of any number of devices. Although the present disclosure has been described in detail, it should be understood that various changes, substitutions, and alterations can be made hereto without departing from the spirit and the scope of the invention as defined by the appended claims.

What is claimed is:

1. A method for performing a firmware update on a device of a computer system, comprising the steps of:
   saving a firmware update application and firmware to the computer system;
   verifying that the firmware update application has the authority to perform the firmware update, wherein verifying comprises the step of determining whether the firmware update application has access to a predetermined encryption key utilized by the computer system;
   encrypting validation data associated with the firmware update application and the firmware, wherein encrypting comprises the step of encrypting the validation data with a second encryption key that includes some content derived from an administrative password associated with the computer system;
   restarting the computer system;
   locating the firmware update application and the firmware;
   decrypting the validation data; and
   initiating the firmware update application.

2. The method for performing a firmware update on a device of a computer system of claim 1, wherein the step of verifying that the firmware update application has the authority to perform the firmware update comprises the step of:
   encrypting a token with the predetermined encryption key, the result being a first encrypted token;
   providing an unencrypted token to the firmware update application;
   encrypting the token at the firmware update application, the result being a second encrypted token;
   comparing the first encrypted token and the second encrypted token; and
   allowing the method for performing a firmware update to continue if the first encrypted token matches the second encrypted token.

3. The method for performing a firmware update on a device of a computer system of claim 1, wherein the predetermined encryption key is maintained by the BIOS of the computer system.

4. The method for performing a firmware update on a device of a computer system of claim 1, further comprising the steps of,
   setting a firmware update available flag following the step of encrypting the firmware update application and the firmware image; and
   initiating the firmware update application following a restart of the computer system only if it is determined that the firmware update available flag is set to true.

5. The method for performing a firmware update on a device of a computer system of claim 1, wherein the second encryption key is comprised of a token provided by the BIOS that is appended to the administrative password associated with the computer system.

6. The method for performing a firmware update on a device of a computer system of claim 1, wherein the firmware update application is DOS-based application.

7. A method for updating the firmware of a target device in a computer system, comprising the steps of:
   providing a firmware update application and firmware update to the computer system;
   verifying that the firmware update application is authorized to update the firmware of the target device, wherein verifying that the firmware update application is authorized comprises the step of verifying that the firmware update application is operable to encrypt a data string according to a predetermined encryption key utilized by the computer system;
   verifying that a user is authorized to update the firmware of the target device, wherein verifying that the user is authorized comprises the steps of:
     prompting the user for a password; and
     verifying that the password provided by the user is a predetermined user password;
   encrypting validation data associated with the firmware update application and the firmware, wherein encrypting the validation data comprises the steps of:
     forming a second encryption key, the second encryption key having content from the user password; and
     encrypting the validation data with the second encryption key;
   resetting the computer system;
   recognizing that a firmware update is available;
   decrypting the validation data; and
   replacing the existing firmware of the target device with the firmware update.

8. The method for updating the firmware of a target device in a computer system of claim 7, wherein the step of verifying that the firmware update application is authorized to perform the firmware update comprises the steps of, encrypting a data string with the predetermined encryption key, with the result being a first encrypted file;

passing an unencrypted version of the data string to the firmware update application;

encrypting at the firmware update application the data string with the second encryption key, with the result being a second encrypted file; and comparing the first encrypted file to the second encrypted file.

9. The method for updating the firmware of a target device in a computer system of claim 7, wherein the step of recognizing that a firmware update is available comprises the steps of, setting a firmware update available flag; and recognizing, following a reset of the computer system, that a firmware update available flag has been set to indicate that a firmware update is available.

10. The method for updating the firmware of a target device in a computer system of claim 7, wherein the step of decrypting the validation data comprises the step of decrypting the validation data with the second encryption key.

11. A method for updating the firmware of a device of a computer system, comprising the steps of:

providing a firmware update to the computer system, the firmware update comprising a firmware update application and a firmware image;

verifying that the firmware update application is authorized to update the firmware of the device, wherein verifying comprises the step of verifying that the firmware update application has access to a predetermined encryption key utilized by the computer system;

encrypting validation data associated with the firmware update application and the firmware image, wherein encrypting comprises the step of encrypting the validation data with a second encryption key that includes some content derived from an administrative password associated with the computer system;

verifying that the user of the computer system is authorized to update the firmware of the device;

causing the computer system to recognize that a verified firmware update is available for the device of the computer system; and executing the firmware update application to cause the firmware image to replace the existing firmware of the device.

12. The method for updating the firmware of a device of a computer system of claim 11, wherein the step of causing the computer system to recognize that a firmware update is available, comprises the steps of, setting a firmware update available flag following the successful completion of the verification steps;

resetting the computer system; and recognizing during the boot of the computer system that a firmware update available flag has been set.

13. The method for updating the firmware of a device of a computer system of claim 11, wherein the step of verifying that the use of the computer is authorized to update the firmware of the device comprises the step of verifying that the user enters the administrative password associated with the computer system.

14. The method for updating the firmware of a device of a computer system of claim 11, wherein the firmware update application is a DOS-based application.

15. A computer system, comprising:

a processor;

memory;

a device driven by firmware associated with the device;

wherein the computer system is operable to update the firmware of the device by, receiving a firmware update application and firmware image;

verifying that the firmware update application is authorized to update the firmware of the device, wherein verifying comprises the step of verifying that the firmware update application has access to a predetermined encryption key utilized by the computer system;

encrypting validation data associated with the firmware update application and the firmware image, wherein encrypting comprises the step of encrypting the validation data with a second encryption key that includes some content derived from an administrative password associated with the computer system;

verifying that the user of the computer system is authorized to update the firmware of the device;

setting a firmware update available flag if both the firmware update application and the user are authorized to update the firmware of the device; and resetting the computer system;

executing the firmware update application to update the firmware of the device with the firmware image.

* * * * *